US011656867B2

(12) United States Patent
Singh et al.

(10) Patent No.: US 11,656,867 B2
(45) Date of Patent: *May 23, 2023

(54) CONDITIONING AUTOREGRESSIVE LANGUAGE MODEL TO IMPROVE CODE MIGRATION

(71) Applicant: Google LLC, Mountain View, CA (US)

(72) Inventors: Rishabh Singh, San Jose, CA (US); David Andre, San Francisco, CA (US); Bin Ni, Fremont, CA (US); Owen Lewis, Stanford, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/945,376

(22) Filed: Sep. 15, 2022

(65) Prior Publication Data
US 2023/0018088 A1    Jan. 19, 2023

Related U.S. Application Data

(63) Continuation of application No. 17/136,968, filed on Dec. 29, 2020, now Pat. No. 11,481,210.

(51) Int. Cl.
  G06F 8/71      (2018.01)
  G06F 40/20     (2020.01)
  G06N 20/00     (2019.01)
(52) U.S. Cl.
  CPC ............ *G06F 8/71* (2013.01); *G06F 40/20* (2020.01); *G06N 20/00* (2019.01)
(58) Field of Classification Search
  CPC ............. G06F 8/71; G06F 40/20; G06F 20/00
  See application file for complete search history.

(56) References Cited

U.S. PATENT DOCUMENTS 8,027,938 B1    9/2011   Xu et al.
10,832,173 B1   11/2020  Pistoia et al.
(Continued)

OTHER PUBLICATIONS

Brown, Tom B. et al.; Language Models are Few-Shot Learners; 75 pages; dated Jul. 22, 2020.
Lachaux, Marie-Anne et al.; Unsupervised Translation of Programming Languages; 21 pages; dated Sep. 22, 2020.
Le, Triet H.M. et al.; Deep Learning for Source Code Modeling and Generation: Models, Applications and Challenges; 37 pages; dated Feb. 13, 2020.
(Continued)

*Primary Examiner* — Douglas M Slachta
(74) *Attorney, Agent, or Firm* — Gray Ice Higdon

(57) ABSTRACT

Implementations are described herein for using machine learning to perform various tasks related to migrating source code based on relatively few ("few shots") demonstrations. In various implementations, an autoregressive language model may be conditioned based on demonstration tuple(s). In some implementations, a demonstration tuple may include a pre-migration version of a first source code snippet and a post-migration version of the first source code snippet. In other implementations, demonstration tuples may include other data, such as intermediate forms (e.g., natural language descriptions or pseudocode), input-output pairs demonstrating intended behavior, etc. The autoregressive language model may be trained on corpora of source code and natural language documentation on the subject of computer programming. A pre-migration version of a source code file may be processed based on the conditioned autoregressive language model, and a post-migration version may be generated based on output generated based on the conditioned autoregressive model.

19 Claims, 8 Drawing Sheets

(56) References Cited

U.S. PATENT DOCUMENTS

| | | | |
|---|---|---|---|
| 2016/0350108 A1* | 12/2016 | Joo | G06F 40/242 |
| 2017/0004121 A1* | 1/2017 | Pino | G06F 40/289 |
| 2018/0275967 A1* | 9/2018 | Mohamed | G06N 3/0445 |
| 2018/0276535 A1 | 9/2018 | Mohamed et al. | |
| 2020/0104174 A1 | 4/2020 | Vlcek et al. | |
| 2020/0150953 A1 | 5/2020 | Smith et al. | |
| 2020/0301672 A1* | 9/2020 | Li | G06F 8/73 |
| 2020/0371778 A1* | 11/2020 | Ni | G06F 8/70 |
| 2020/0387675 A1 | 12/2020 | Nugent et al. | |
| 2021/0097444 A1 | 4/2021 | Bansal et al. | |
| 2021/0141863 A1 | 5/2021 | Wu et al. | |
| 2021/0192397 A1 | 6/2021 | Rastogi et al. | |
| 2021/0209313 A1 | 7/2021 | Li et al. | |
| 2021/0256217 A1 | 8/2021 | Vaithiyanathan | |
| 2021/0397610 A1 | 12/2021 | Singh et al. | |
| 2022/0206785 A1 | 6/2022 | Singh et al. | |

OTHER PUBLICATIONS

Metz, Cade; Meet GPT-3. It Has Learned to Code (and Blog and Argue); The New York Times; 8 pages; dated Nov. 24, 2020.

Radford, A.; Language Models are Unsupervised Multitask Learners; 24 pages; dated 2019.

Ravichandran, Avinash et al.; Few-Shot Learning with Embedded Class Models and Shot-Free Meta Training; IEEE; 9 pages; dated 2019.

Sagar, Ram; OpenAI's GPT-3 Can Now Generate the Code for You; 4 pages; dated Jul. 20, 2020.

Sanh, Victor et al.; DistilBERT, a Distilled Version of BERT: Smaller; Faster, Cheaper and Lighter; 5 pages; dated Mar. 1, 2020.

Wang, Yaqing et al.; Generalizing from a Few Examples: A Survey on Few-Shot Learning; 34 pages; dated Mar. 29, 2020.

* cited by examiner

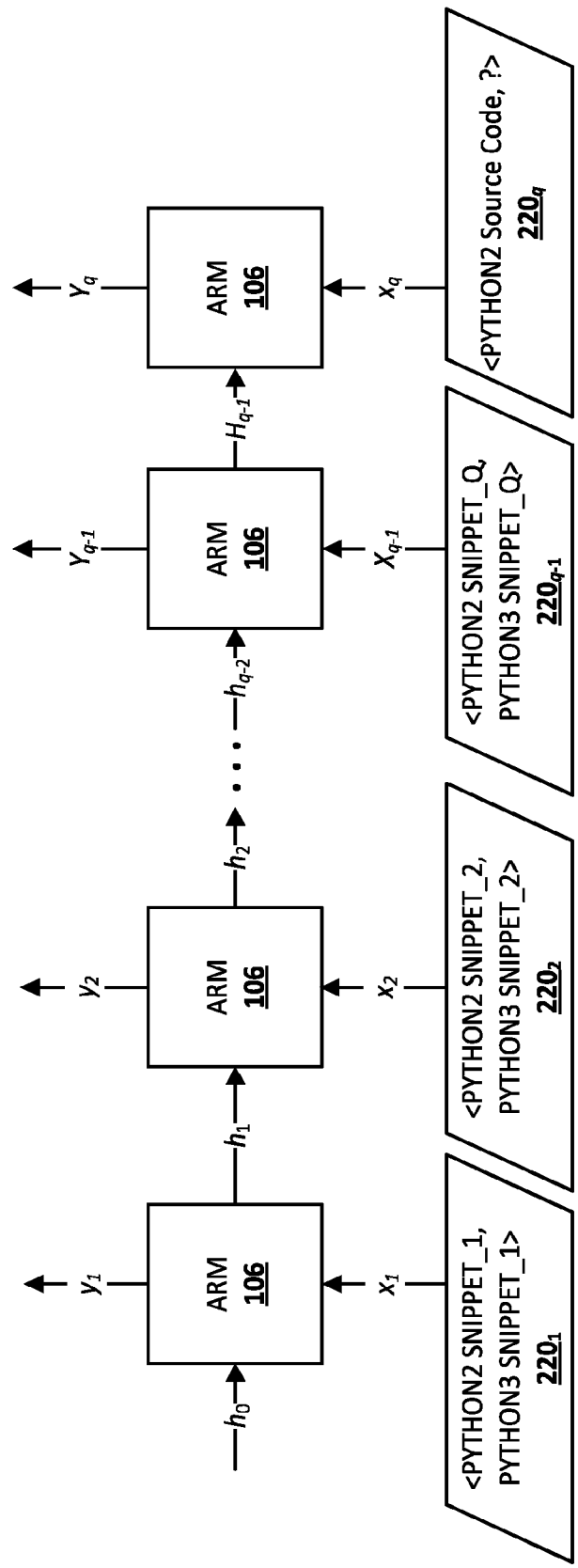

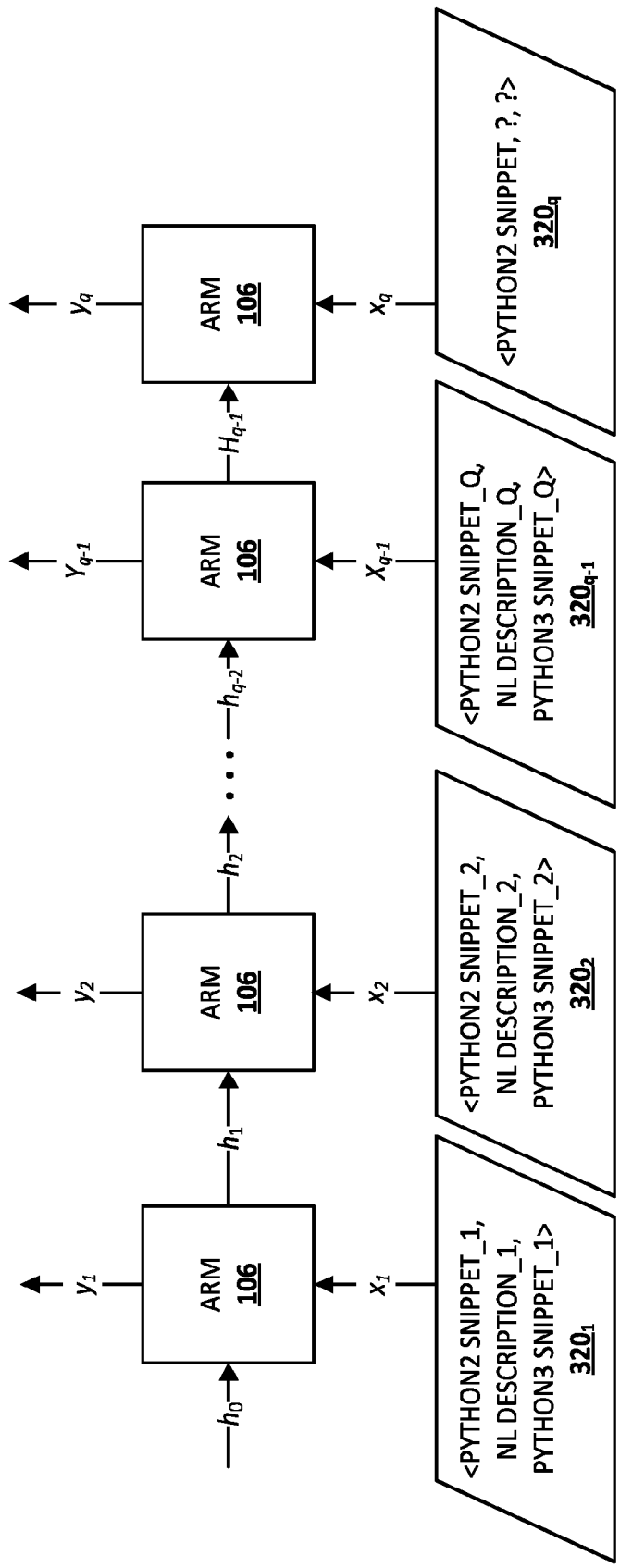

BASH

```
Please provide demonstration(s). When finished,
press ctrl-enter to enter file(s) to be migrated:

Source: dba_open("/startup_company/loans.db", "rwl")
Target: dba_open("/buyer_company/debts.db", "r")
Target: "Change paths and tokens to reflect company
purchase, infrastructure changes, and to revoke
write access"

Source: hypothetical_function($arg)
Target:
     $arg = Mutex::create();
     hypothetical_function($arg);
     Mutex::destroy($arg);
Target: "Convert to multithread"

<ctrl-enter>

"/codebase/hypothetical.php"

Hypothetical.php has been successfully migrated, 54
instances of code were changed, and a commit was
generated for VCS.  See /tmp/migrate.log for
details.
```

Fig. 4

```
BASH

Please provide demonstration(s). When finished,
press ctrl-enter to enter file(s) to be migrated:

Source:
def addUpto(a):
  sum = 0
  for i in xrange(a):
    sum += i
  return sum Target:
def addUpto(a):
  sum = 0
  for i in range(a):
    sum += i
  return sum
<ctrl-enter>

"/codebase/hypothetical.py"

Hypothetical.py has been successfully migrated, 3
instances of code were changed, and a commit was
generated for VCS.  See /tmp/migrate.log for
details.
```

Fig. 5

```
BASH

Please provide demonstration(s). When finished,
press ctrl-enter to enter file(s) to be migrated:

"Migrate from Python2 to Python3"

def addUpto(a):
  sum = 0
  for i in xrange(a):
    sum += i
  return sum addUpto(1) --> 0
  addUpto(2) --> 1
  addUpto(5) --> 10

<ctrl-enter>

"/codebase/hypothetical.py"

Hypothetical.py has been successfully migrated, 3
instances of code were changed, and a commit was
generated for VCS.  See /tmp/migrate.log for
details.
```

Fig. 6

CONDITIONING AUTOREGRESSIVE LANGUAGE MODEL TO IMPROVE CODE MIGRATION

BACKGROUND

Various types of machine learning models can be trained to generate source code under a variety of circumstances. Some machine learning models may be trained to translate source code from one programming language to another. Other machine learning models may be trained to flag and/or fix potential issues with source code that might be missed by a compiler, such as security issues, logical issues, etc.

A significant challenge with these types of machine learning models is obtaining sufficient training data. For example, it may be difficult to obtain enough labeled pairs of source code snippets (e.g., that implement the same function in two different programming languages) to sufficiently train a machine learning model to perform its task (e.g., translating between the two different programming languages) accurately. Even when sufficient training data is available for supervised training, problems such as overfitting can occur. Unlike these machine learning models, humans are capable of detecting patterns in a relatively small number of examples. However, some programming tasks, such as migrating a large code base from one form to another, are cumbersome and/or time-consuming for humans to perform at scale.

SUMMARY

Implementations are described herein for using machine learning to perform a variety of tasks related to migration of source code based on a relatively small number ("few shots") of demonstrations. For example, during inference, one or more demonstration tuples (e.g., pairs, triplets, etc.) that include a source code snippet before and after a planned source code migration may be used to condition a machine learning model, such as an autoregressive language model, to perform a task established by the demonstration tuple(s). Once conditioned based on these demonstration tuple(s), the machine learning model may be used to process yet-to-be-migrated source code in a manner consistent with the demonstration(s). Thus, for instance, if the demonstration(s) include examples of source code snippets being converted from C to C++, then the yet-to-be-migrated source code may likewise be converted from C to C++.

In some implementations, a user such as a programmer may provide these demonstrations explicitly, e.g., by typing source code text into a field. In other implementations, these demonstrations may be selected explicitly by the programmer, e.g., from a list. Alternatively, a programmer may provide a free-form natural language input that conveys the programmer's desire or intent (e.g., "I want to migrate source code from Python2 to Python3"), and demonstrations that sufficiently match the intent (e.g., are sufficiently semantically similar) may be selected from a library of existing demonstrations.

In various implementations, the machine learning model may be an autoregressive language model (e.g., trained to perform natural language processing, or "NLP") such as a bidirectional encoder representations from transformers (BERT)-based model (also referred to herein as a "transformer" model). By conditioning such an autoregressive language model with demonstration(s), the autoregressive language model is effectively "primed" to perform a task established by the demonstration(s), e.g., by being more likely to select output candidates that are aligned with the demonstrated task.

For example, during conditioning the demonstrations may be processed using the autoregressive language model to generate intermediate embedding(s). These intermediate embeddings may then be provided as inputs (e.g., acting as a form of memory) for subsequent iterations of the autoregressive language model in which yet-to-be-migrated source code is processed. As a result of these intermediate embeddings being processed by the model in conjunction with the yet-to-be-migrated source code, candidate outputs of the model that are more closely aligned with the demonstrated task may be assigned greater probabilities than others. In particular, these higher-probability outputs may more closely resemble, semantically, source code transformations shown by the demonstrations.

In some implementations, the autoregressive language model may have been trained previously on one or more corpuses related specifically to computer programming, as opposed to general-purpose corpuses such as encyclopedias, newspapers, magazines, etc. These computer programming-related corpuses can include source code (e.g., multiple code bases in a variety of different programming languages) and natural language documentation about computer programming. Training the autoregressive language model specifically using computer-programming-related corpuses enables the model, upon conditioning with demonstrations pertinent to a source code migration, to more accurately generate post-migration source code.

Natural language computer programming documentation may include any natural language that describes source code itself, instructs readers how to create source code, and/or provides guidelines for how source code should be written to comport with, for instance, standards, desired styles, proprietary mandates, operational requirements, security requirements, and so forth. Natural language computer programming documentation may include, but is not limited to, educational literature such as textbooks, programming language guides or tutorials, inline comments in source code files, comments that are provided when a programmer commits revised source code to a version control system (VCS), and so forth.

In addition to improving its accuracy in generating post-migration source code, training the autoregressive language model based on natural language computer programming documentation enables the model to be used for other purposes. For example, the autoregressive language model, upon suitable conditioning, may be used to generate natural language snippets that describe source code (e.g., its purpose, function, intent, inner workings, etc.), and/or natural language snippets that describe an intent behind a source code migration (e.g., migrating from C to C++, upgrading source code for multi-thread performance, etc.). To this end, in some implementations, a natural language snippet that describes the source code (e.g., its function, purpose, or intent) and/or an intent behind the migration may be provided as part of one or more demonstrations. In some implementations, these generated natural language snippets may be added to the post-migration source code, e.g., as inline comments and/or as suggestions for comments to be submitted to a VCS.

In some implementations, the autoregressive language model may be used in multiple stages to generate intermediate output(s). For example, source code in a first programming language may be converted to an intermediate form, such as natural language describing how the source code operates, or a canonical programming language such as pseudocode. Then, the intermediate form may be converted to a second programming language. In some such implementations, translating from an intermediate form to the second programing language may result in less syntactical errors than translating directly from the first programming language to the second programming language, e.g., because conversion from the first programming language to the intermediate form reduces syntactical noise while leaving intact the semantic meaning/intent behind the source code.

In some implementations, a method implemented using one or more processors may include: conditioning an autoregressive language model based on one or more demonstration tuples, wherein one or more of the demonstration tuples includes a first version of a first source code snippet that exists prior to a planned migration and a second version of the first source code snippet that is desired after the planned migration, and wherein the autoregressive language model is trained on one or more corpuses of source code and one or more corpuses of natural language documentation on the subject of computer programming; processing a pre-migration version of a source code file based on the conditioned autoregressive language model; and based on the processing, generating a post-migration version of the source code file.

In various implementations, one or more of the demonstration tuples includes a third source code snippet, an example input for the third source code snippet, and a target output of the third source code snippet given the example input. In various implementations, in the second version of the first source code snippet, at least a first token may be transformed into a target nomenclature; and in the post-migration version of the source code file, at least a second token that is different than the first token may be transformed into the target nomenclature. In various implementations, the target nomenclature captures a desired coding style used by an entity or a desired coding style espoused by computer programming educational literature that is included in one or more of the corpuses of natural language documentation about computer programming.

In various implementations, the method may include receiving one or more of the demonstration tuples via textual input provided by a user. In various implementations, the method may include selecting one or more of the demonstration tuples from a library of existing demonstration tuples based on user input. In various implementations, the user input may include a free-form natural language input spoken or typed by a user, and the selecting is based on semantic similarity between the free-form natural language input and the selected one or more of the demonstration tuples.

In various implementations, one or more of the demonstration tuples may include a natural language snippet that describes the first source code snippet, and wherein the method includes, based on the processing, generating another natural language snippet that describes the source code file. In various implementations, the autoregressive language model may be trained exclusively on the one or more corpuses of source code and the one or more corpuses of natural language documentation on the subject of computer programming.

In some implementations, the method may further include: performing a semantic comparison of the pre-migration source code file and the post-migration source code file; and based on the semantic comparison: selecting another post-migration version of the source code file from a distribution generated by the autoregressive language model; or performing supervised training on the autoregressive language model based on the pre-migration and post-migration versions of the source code file.

In another aspect, a method may be implemented using one or more processors and may include: conditioning an autoregressive language model based on one or more demonstration tuples, wherein one or more of the demonstration tuples includes a first version of a first source code snippet that exists prior to a planned migration, an example input for the first source code snippet, and a target output of the first source code snippet given the example input, and wherein the autoregressive language model is trained exclusively on one or more corpuses of source code and one or more corpuses of natural language documentation on the subject of computer programming; processing a pre-migration version of a source code file based on the conditioned autoregressive language model; and based on the processing, generating a post-migration version of the source code file.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 2 schematically demonstrates an example of how aspects of the present disclosure may be implemented, in accordance with various implementations.

FIG. 3 schematically demonstrates another example of how aspects of the present disclosure may be implemented, in accordance with various implementations.

FIG. 4 depicts an example graphical user interface (GUI) that may be presented in accordance with various implementations described herein.

FIG. 5 depicts another GUI that may be presented in accordance with various implementations described herein.

FIG. 6 depicts another GUI that may be presented in accordance with various implementations described herein.

DETAILED DESCRIPTION

Figure 1:
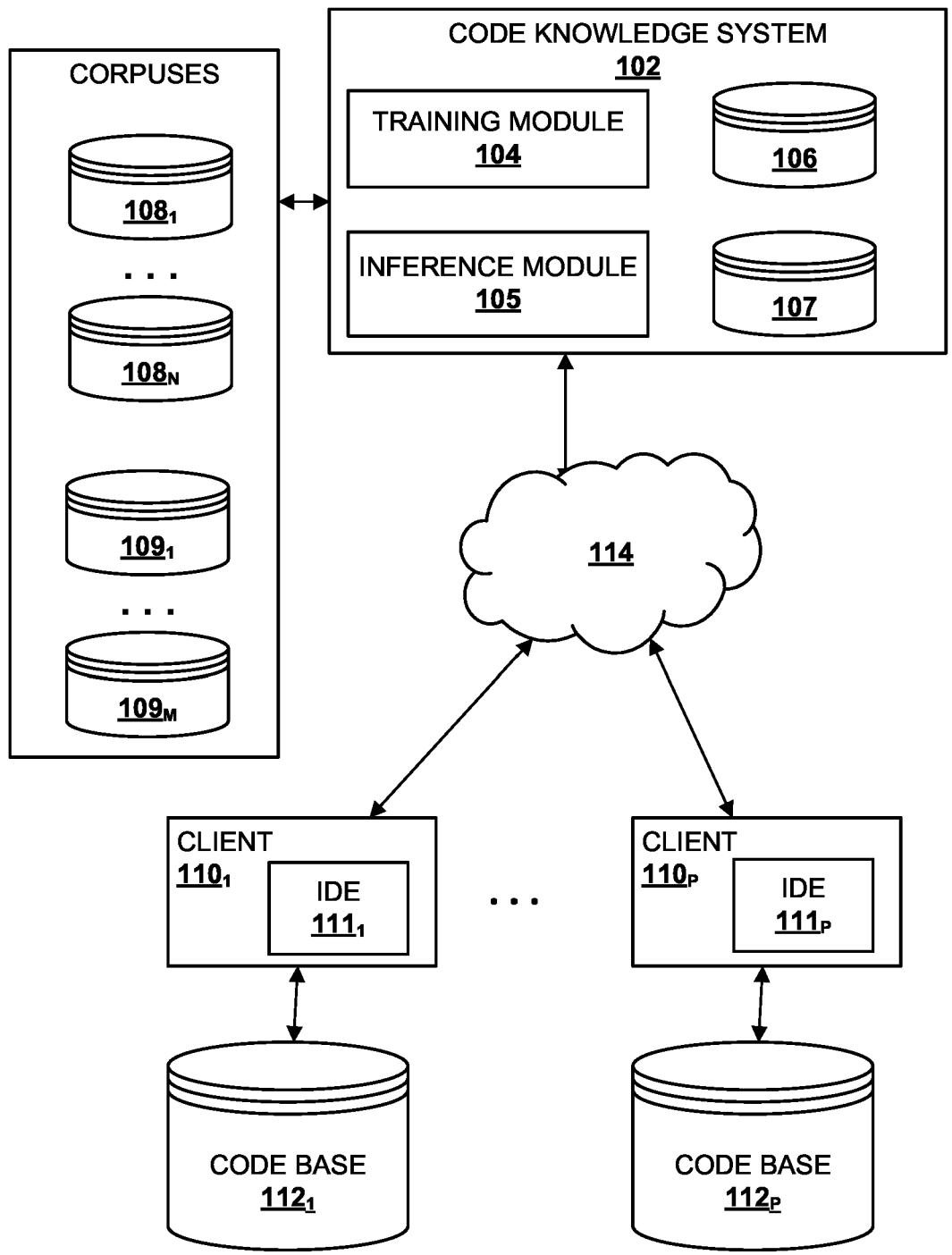
FIG. 1 schematically depicts an example environment in which selected aspects of the present disclosure may be implemented, in accordance with various implementations.

FIG. 1 schematically depicts an example environment in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs," etc.) that execute computer-readable instructions stored in memory, or other types of logic such as application-specific integrated circuits ("ASIC") (including "tensor processing units" or "TPUs"), field-programmable gate arrays ("FPGA"), and so forth. Some of the systems depicted in FIG. 1, such as a code knowledge system 102, may be implemented using one or more server computing devices that form what is sometimes referred to as a "cloud infrastructure" or "the cloud," although this is not required.

A code knowledge system 102 may be provided for helping clients $110_{1-P}$ manage their respective code bases $112_{1-P}$. Code knowledge system 102 may include, among other things, a training module 104 and an inference module 105 that are configured to perform selected aspects of the present disclosure in order to help one or more clients $110_{1-P}$ to make changes to one or more corresponding code bases $112_{1-P}$, particularly to migrate code from one form to another. Each client 110 may be, for example, an entity or organization such as a business (e.g., financial institute, bank, etc.), non-profit, club, university, government agency, or any other organization that operates one or more software systems. For example, a bank may operate one or more software systems to manage the money under its control, including tracking deposits and withdrawals, tracking loans, tracking investments, and so forth. An airline may operate one or more software systems for booking/canceling/rebooking flight reservations, managing delays or cancelations of flight, managing people associated with flights, such as passengers, air crews, and ground crews, managing airport gates, and so forth. In some implementations, each client 110 may make changes to its code base 112 using one or more instances of an integrated development environment (IDE) 111 operating on one or more computing devices.

Training module 104 and inference module 105 may have access to one or more autoregressive language model(s) 106. These autoregressive language models 106 may take various forms, including but not limited to an encoder-decoder, various flavors of a recurrent neural network (RNN, e.g., long short-term memory, or "LSTM", gate recurrent units, or "GRU", etc.), a transformers (BERT)-based transformer model, and any other type of machine learning model that may be applied to facilitate selected aspects of the present disclosure, particularly generating post-migration version(s) of pre-migration source code.

In various implementations, training module 104 may be configured to train autoregressive language model(s) 106 based on one or more corpuses of source code $108_{1-N}$ and one or more corpuses of natural language documentation on the subject of computer programming $109_{1-M}$. One or more corpuses of source code $108_{1-N}$ may include source code files written in any number of programming languages, as well as in multiple versions of the same programming language (e.g., Python1 versus Python2 versus Python3, C versus C++, etc.). One or more corpuses of natural language documentation on the subject of computer programming $109_{1-M}$ may include, for instance, computer programming textbooks, computer-programming HOWTO guides, inline comments contained in source code files, natural language comments stored in version control systems (VCS), e.g., during a "commit" of a recently-edited source code file, and so forth.

In some implementations, training module 104 may train autoregressive language model(s) 106 exclusively based on corpuses $108_{1-N}$ and $109_{1-M}$, e.g., to the exclusion of other corpuses of data that include neither source code nor documentation on the subject of source code. By training machine learning model(s) on such computer-programming-focused corpuses, and especially if non-computer-programming-related resources such as fictional literature, periodicals, general purpose encyclopedias, etc. are excluded from training, the resulting autoregressive language model 106 may "learn", for instance, semantic intents of various source code snippets (e.g., small pieces of source code from larger source code files), e.g., by mapping high-level intents to corresponding semantic information at various levels of abstraction. These semantic intents may be expressed, for instance, via natural language or via source code written in various programming languages. Autoregressive language model 106 may also "learn" how to transform these semantic intents into desired representations such as source code snippet(s) in a particular programming language.

Once autoregressive language model 106 is trained, it may be used by inference module 105, e.g., at the behest of programmer associated with a client 110, to generate output in a variety of forms, depending on how autoregressive language model 106 is "conditioned" or "primed" based on one or more demonstration(s) that express a programmer's intent. Inference module 105 may condition autoregressive language model 106 by processing one or more demonstrations using autoregressive language model 106 first. Once conditioned, inference module 105 may process a new input such as a source code file to be migrated based on autoregressive language model 106. Because autoregressive language model 106 has been conditioned based on the demonstration(s), it is more likely to generate output that is consistent with the programmer's intent that is manifested in the demonstration(s).

In various implementations, demonstration(s) may be composed by the programmer, e.g., on-the-fly or on demand, or selected from a library 107 of existing demonstrations to express an intent of the programmer. In the latter case, an existing demonstration may be selected from library 107 automatically, e.g., by inference module 105 based on some indication of the programmer's intent, such as a natural language statement composed by the (e.g., "migrate from Python2 to Python3"). Alternatively, a demonstration may be explicitly selected from library 107 by the programmer, e.g., by the programmer selecting one or more demonstrations from a menu. If the programmer provides one demonstration, that is referred to as "one shot" learning (i.e., conditioning) of autoregressive language model 106. If the programmer provides multiple (albeit a relatively small number of) demonstrations, that may be referred to as "few shot" learning.

Output generated based on autoregressive language model 106 depends on the demonstration(s) provided by the programmer. For example, a programmer may provide one or more demonstration tuples (e.g., pairs, triples, etc.) that each includes, for instance, a first version of a first source code snippet that exists prior to a planned migration and a second version of the first source code snippet that is desired after the planned migration. Processing these demonstration tuple(s) conditions autoregressive language model 106 to perform similar transformations. Consequently, when subsequent pre-migration source code is applied as input to autoregressive language model 106, even with potentially myriad candidate outputs (e.g., tokens, symbols) available at each iteration, those candidate outputs that would (individually or collectively) transform the pre-migration source code in manner(s) shown by the demonstration(s) are more likely to be selected as the ultimate output(s) (i.e. as a post-migration version of the source code).

Demonstrations used to condition or prime autoregressive language model 106 can be tuples with any number of elements, such as one, two, three, etc. In the example above related to source code migration, one element of a tuple may be a pre-migration version of a source code snippet and another element of the tuple may be a post-migration version of the source code snippet. This is demonstrated schematically in FIG. 2.

In FIG. 2, autoregressive language model (ARLM) 106 is shown in a partially "unfolded" state to demonstrate how it can be operated for q−1 (q being an integer) "demonstration iterations" prior to ARLM 106 being applied to source-code-to-be-migrated at demonstration iteration q. In this example ARLM 106 most resembles a recurrent neural network, but this is not meant to be limiting. As noted above, ARLM 106 may take various forms, such as an LSTM network, a GRU network, a transformer network, etc.

Moreover, it should be noted that the q iterations shown in FIG. 2 correspond to "demonstration iterations," not necessarily to iterations of ARLM 106 itself. To wit, during each demonstration iteration i, ARLM 106 may in fact be applied for as many token/symbol iterations as there are tokens and/or symbols in the demonstration 220. Each demonstration tuple 220 in FIG. 2 includes a source code snippet written using Python2 and the same source code snippet written using Python3. Accordingly, the demonstrations $220_{1\ to\ q-1}$ collectively condition ARLM 106 to migrate Python2 source code to Python3 source code.

At each demonstration iteration i (e.g., integer), constituent tokens/symbols of demonstration $220_i$ are applied iteratively as inputs $x_i$ to ARLM 106, along with data $h_{i-1}$ from a previous demonstration iteration. Thus, during the first demonstration iteration i=1, constituent tokens/symbols of first demonstration tuple $220_1$ are applied iteratively as inputs $x_1$ to ARLM 106, along with data $h_0$ (which may be zero or null since there were no previous iterations), to generate outputs $y_1$ (with each individual output of outputs $y_1$ constituting the next predicted token or symbol, for instance). During the second demonstration iteration i=2, constituent tokens/symbols of second demonstration tuple $220_2$ are applied iteratively as inputs $x_2$ to ARLM 106, along with data $h_1$ (built up during iterations of first demonstration iteration i=1), to generate outputs $y_2$. And so on.

After the q−1 demonstration iterations, instead of an additional demonstration, the programmer provides pre-migration source code to be processed—here, a Python2 source code file—in a manner consistent with the demonstrations up to this point. In FIG. 2, this additional input/pre-migration code is provided as a qth tuple $220q$ with the other element empty (as represented by the "?"), but this need not necessarily be the case. Tokens/symbols of this pre-migration source code may be applied iteratively as inputs $x_q$ to ARLM 106, along with data $h_{q-1}$, to generate outputs $y_q$. The outputs $y_q$ may form a post-migration (e.g., Python3) version of the pre-migration source code provided as part of qth tuple $220_q$.

FIG. 3 schematically demonstrations a process similar to that of FIG. 2, with one primary distinction. In FIG. 2, the demonstration tuples $220_{1\ to\ q-1}$ included pairs of pre-migration and post-migration source code. In FIG. 3, by contrast, the demonstration tuples $320_{1\ to\ q-1}$ include triplets or 3-tuples, with each 3-tuple including a pre-migration version of a source code snippet, a natural language ("NL") description of the source code snippet, and a post-migration version of the source code snippet. Other aspects of FIG. 3 are similar to FIG. 2.

Given the demonstration tuples $220_{1\ to\ q-1}$ of FIG. 3, ARLM 106 is conditioned or primed to generate both a natural language description of input source code and a post-migration version of the input source code. In some implementations, the natural language description may serve as an intermediate form or output of the source code snippet, with the post-migration version of the source code snippet being generated based on the natural language description of the source code snippet and the pre-migration version of the source code snippet.

In some cases, a large number of iterations of ARLM 106 (as opposed to demonstration iterations) may have elapsed since tokens/symbols of the pre-migration version of the source code snippet were processed. As a consequence, the natural language description of the source code snippet may have a proportionately greater influence on the post-migration version of the source code. In some implementations, in fact, ARLM 106 may be so strongly conditioned that it is able to generate a post-migration version of a source code snippet with only the natural language description of the source code snippet, and without a pre-migration version of the source code snippet. In this manner, a programmer may truly be able to express their intent via natural language, and ARLM 106 may be able to generate post-migration source code. Moreover, having a natural language description of the source code snippet as an intermediate output may enable other functionality, such as translation from one programming language to another. For example, where ARLM 106 is an autoencoder-based machine learning model, one interchangeable decoder could generate C code from natural language descriptions of source code, another interchangeable decoder could generate Java code based on natural language descriptions of source code, and so on.

In some implementations, rather than pure natural language, the intermediate output may be in the form of pseudocode and/or a canonical programming language version of the intended program logic. For example, a for loop in Java may be written as follows: for(int i=0; i<n; i++). The same logic can be represented more generically as, for instance, "for i 1 ... n." This pseudocode version of the logic may be more easily and/or accurately translated into a different programming language or a different version of the same programming language. As another example demonstration, the following Java code may be used as a source portion of a demonstration tuple:

k=0;
for(int i=0; i<10; i++)
  k=k+2;

The following pseudocode could be provided as a target, e.g., to act as an intermediate form that is relatively agnostic to particular programming languages but instead conveys the intent behind the code:

k=0, 2, 4, 6, 8, 10, 12, 14, 16, 18, 20
Here is another example: k=5; for(int i=1; i<10; i++) k= k+2; →k=5, 7, 9, 11, 13, 15, 17, 19, 21, 23

FIG. 4 depicts an example graphical user interface in the form of a command line prompt shell that a programmer can interact, e.g., via command line input, with to apply ARLM 106 as described herein. This is not meant to be limiting, and programmers may employ techniques described herein using other types of interfaces. In some implementations, IDE 111 may include a command line and/or graphical user interface that enables programmers to take advantage of techniques described herein.

In FIG. 4, the programmer has provided a demonstration via two 3-tuple demonstrations, each which includes a "source" and two "targets." The programmer's intent is to migrate source code (in the PHP: Hypertext Preprocessor or "PHP" scripting language) from a (hypothetical) startup company's infrastructure and/or nomenclature to that of a (hypothetical) entity that purchased the startup company. The source of the first demonstration tuple is a pre-migration version of a source code snippet, "dba_open("/startup_company/loans.db", "rwl")." The first target is a post-migration version of the source code snippet, "dba_open("/buyer_company/debts.db", "r")." The second target is a natural language statement describing the transformation that has been made as part of the migration, "Change paths and tokens to reflect company purchase, infrastructure changes, and to revoke write access."

The source of the second demonstration tuple is the name of a function, "hypothetical_function," along with an argument $arg to be passed to the function; in other words, a source code snippet that causes the function to be called with $arg as the argument. The first target of the second demonstration tuple is a post-migration version of the same source code snippet, where the call to the hypothetical_function has been modified so that $arg is locked during, and is unlocked after, execution of hypothetical_function:

Source:
  hypothetical_function($arg)
Target:
  $arg=Mutex::create( );
  hypothetical_function($arg);
  Mutex::destroy($arg);

The second target of the second demonstration tuple is natural language text describing the transformation being made, "Convert to multithread."

After the programmer has finished entering demonstrations, in some implementations the programmer may signal an intent to process a new input, e.g., by pressing ctrl-enter as instructed. However, such a prompt may not be necessary because in many implementations, elements of demonstration tuples are simply processed by ARLM 106 in the sequence they are provided, and the next element provided may simply be the source code the user wishes to act upon. In this example, the programmer provides the name of a source code file, "hypothetical.php," which causes ARLM 106 to be iteratively applied to tokens/symbols of that source code file to generate output. Due to the conditioning applied to ARLM 106 previously, the output of this iterative applying may be a post-migration version of hypothetical.php, as well as natural language statement(s) describing transformations that were made. These natural language statements may be inserted into post-migration hypothetical.php at various locations, such as inline comments proximate to source code snippets that were changed.

In some implementations, the programmer may be able to navigate quickly through the changes made to hypothetical.php. For example, IDE 111 may be configured to allow the programmer to toggle through the changes similar to a text search that is available in most text editors. In some such implementations, the programmer may take various actions at each change, such as accepting it, rejecting it, or modifying it manually. Additionally or alternatively, the programmer may be provided with a list of changes, e.g., in a pop-up window or in a command line shell similar to that of FIG. 4. In some such implementations the programmer may be able to click or otherwise select changes from the list to see those changes in more detail (e.g., in the context of surrounding code), make edits to the changes, accept them, reject them, etc. As indicated at the bottom of FIG. 4, in some implementations, a log file may be generated that provides details about (and in some cases, a list of selectable elements for navigation to) individual changes. A "commit" statement was also generated in this example, e.g., similar to the natural language statements provided in the demonstrations.

Demonstrations are not limited to pre- and post-migration source code, and to natural language statements describing the source code and/or its migration. In various implementations, other evidence of the programmer's intent may be provided as part of a demonstration to condition ARLM 106 to process source code. FIG. 5 depicts one such example.

In FIG. 5, which depicts a similar shell graphical user interface as FIG. 4, the programmer has provided one demonstration that migrates a function called "addUpto" from Python2 (Source) to Python3 (Target). Notably, the programmer has not provided any explicit indication of an intent to make such a migration. Rather, the demonstration itself implies the programmer's intent. In this example, the only change between the Source and Target is that the function "xrange" has been edited to "range," which is a nomenclature change that was made to the Python standard at the release of Python3.

Because ARLM 106 has been trained on myriad source code examples, including examples in both Python2 and Python3, this demonstration conditions ARLM 106 to convert any newly-provided source code from Python2 to Python3. In particular, at each iteration of ARLM 106, candidate output tokens/symbols that are consistent with migrating the current input token/symbol from Python2 to Python3 (including no change to the token/symbol in many cases) will be assigned greater probabilities—and hence, be more likely to be selected as the ultimate output—than other tokens/symbols. Consequently, when the programmer provides the Python2 source code file "hypothetical.py" as the next input, the outputs generated by ARLM 106 may constitute a Python3 version of hypothetical.py.

FIG. 6 demonstrates an example in which example inputs and corresponding target outputs of source code are provided as part of the demonstration. Such example inputs/outputs may provide additional evidence of the programmer's intent. In this example, the programmer provides, as a demonstration 3-tuple, a source natural statement "Migrate from Python2 to Python3" and a source code snippet (a function called "addUpto") written in Python2 (as evidenced by the presence of the token "xrange," rather than "range" as is the standard in Python3).

The programmer next provides three pairs of example inputs target outputs that demonstrate what output should be generated by the source code snippet under various circumstances (i.e., between various values of the input to addUPto). Then, the programmer provides a path to the source code file "hypothetical.py" to cause that source code file to be processed by ARLM 106 next. Because ARLM 106 has been conditioned on the relationship between the source code snippet and the example inputs/target outputs, ARLM 106 is more likely at each iteration to select tokens/symbols that are consistent with the demonstration in particular, and migration from Python2 to Python3 in general.

Figure 7:
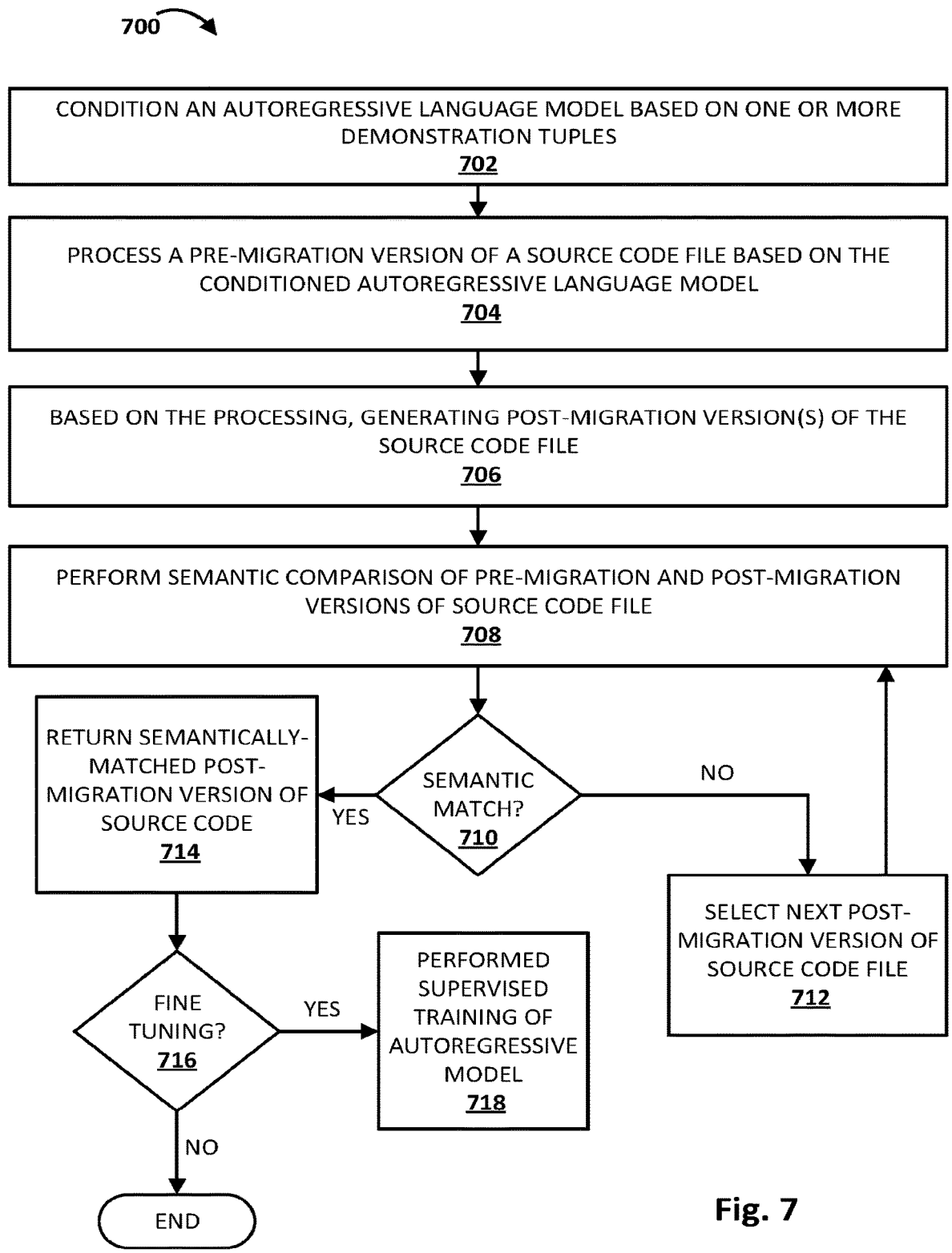
FIG. 7 depicts a flowchart illustrating an example method for practicing selected aspects of the present disclosure.

FIG. 7 is a flowchart illustrating an example method 700 of practicing selected aspects of the present disclosure, in accordance with implementations disclosed herein. For convenience, the operations of the flow chart are described with reference to a system that performs the operations. This system may include various components of various computer systems, such as one or more components of code knowledge system 102. Moreover, while operations of method 700 are shown in a particular order, this is not meant to be limiting. One or more operations may be reordered, omitted or added.

At block 702, the system may condition ARLM 106 based on one or more demonstration tuples. In some implementations, one or more of the demonstration tuples may include a first version of a first source code snippet that exists prior to a planned migration and a second version of the first source code snippet that is desired after the planned migration, such that the demonstration evidences an intent to migrate source code. In other cases, and as demonstrated in FIG. 6, the demonstration tuple(s) may include a first version of a first source code snippet that exists prior to a planned migration, an example input for the first source code snippet, and a target output of the first source code snippet given the example input. These demonstration tuple(s) may be composed by the programming on the fly, may be explicitly selected by the programmer from a library of existing demonstration tuples, and or may be selected implicitly from a library of existing demonstration tuples, e.g., based on semantic analysis of a natural language instruction provided by the programmer (e.g., "Migrate from Python2 to Python3").

As noted previously, ARLM 106 may be trained, in some cases exclusively, on one or more corpuses of source code and one or more corpuses of natural language documentation on the subject of computer programming. In some such implementations, non-computer-programming related literature, such as fiction books, poetry, periodicals, magazines, encyclopedias, scientific journals from other non-programming domains (e.g., biology, chemistry, geology, etc.), may be intentionally withheld from training in order to ensure ARLM 106 is optimized for performing source code-related tasks, particularly performing large scale source code migrations.

At block 704, the system may process a pre-migration version of a source code file based on the conditioned autoregressive language model. In FIGS. 4-6, the programmer pressed ctrl-enter to signal intent to provide an input file to be processed. In other implementations, a distinction need not necessarily be so clear between demonstrations and source code to be migrated, as ARLM 106 may simply be applied to whatever "next" input the programmer provides, regardless of whether that next input is a demonstration intended to condition ARLM 106 or source code intended to be migrated. Based on the processing of block 704, at block 706, the system may generate a post-migration version of the source code file.

In some implementations, instead of migrating source code between one version and another (e.g., Python2 to Python3), source code may be migrated into a target nomenclature. For example, as part of a demonstration, a programmer may demonstrate how one token should be transformed into the target nomenclature (e.g., "/startup_company/loans.db" "/buyer_company/debts.db" in FIG. 4). Assuming ARLM 106 has been trained on source code in the target nomenclature, this demonstration may condition ARLM 106 to convert additional source code into the target nomenclature, including other tokens different from the token that was changed in the demonstration. In some implementations, the target nomenclature may capture a desired coding style used by an entity such as a company (e.g., embodying the company's programming standards), a particular programmer (e.g., a prolific and widely-respected programmer), a desired coding style espoused by computer programming educational literature that is included in one or more of the corpuses of natural language documentation about computer programming, and so forth.

In some implementations, post-migration source code generated using techniques described herein may be analyzed, e.g., for semantic correctness and/or consistency with the pre-migration input source code. This analysis may facilitate a variety of additional technical benefits. For example, pairs of pre- and post-migration source code that are confirmed to be semantically consistent may be used to fine tune ARLM 106 further, e.g., so that it becomes even better at selecting the best outputs (e.g., tokens and/or symbols) from a distribution of outputs. Continuing with method 700 of FIG. 7, blocks 708-718 demonstrate examples of how such semantic comparison may be leveraged to improve ARLM 106 and/or to ensure that a user is provided with post-migration source code that is semantically consistent with the pre-migration source code they provide.

At block 708, the system may perform a semantic comparison of the pre-migration and post-migration versions of the source code file. For example, techniques such as symbolic model checking may be employed to determine whether the pre-migration and post-migration versions of the source code file are, from a mathematical standpoint, semantically equivalent (e.g., will generate the same or consistent output given the same input). Various symbolic model checking techniques may be employed, including but not limited to binary decision diagrams (BDDs), bounded model checking algorithms, abstraction attempts, or Counterexample guided abstraction refinement (CEGAR), to name a few.

If, at block 710, the system determines that there is not a semantic match between the pre-migration and post-migration versions of the source code file, then in some implementations, method 700 may proceed to block 712, at which point another candidate output of ARLM 106 that was weighted less heavily may be selected from a distribution of candidate outputs of ARLM 106. Method 700 may then proceed back to block 708. Thus, a loop is repeated between blocks 708-712 until semantically-matching post-migration source code is found.

If, at block 710, the system determines that there is a semantic match between the pre-migration and post-migration versions of the source code file, then method 700 proceeds to block 714. At block 714, the semantically-matched post-migration source code is returned to the user as a correct migration of the pre-migration source code. In some implementations, a determination may be made at block 716 of whether ARLM 106 is undergoing fine tuning, e.g., via supervised training that supplements previous unsupervised training. If the answer at block 716 is no, then method 700 may end. However, if the answer is yes, then at block 718, the system may perform supervised training of ARLM 106 based on the semantically-matched post-migration source code. In this way, the performance of ARLM 106 for migration source code between various forms continues to improve over time. While blocks 708-718 demonstrate ARLM 106 being updated in real time, in other implementations, similar techniques may be employed to fine tune ARLM 106 in batches.

Figure 8:
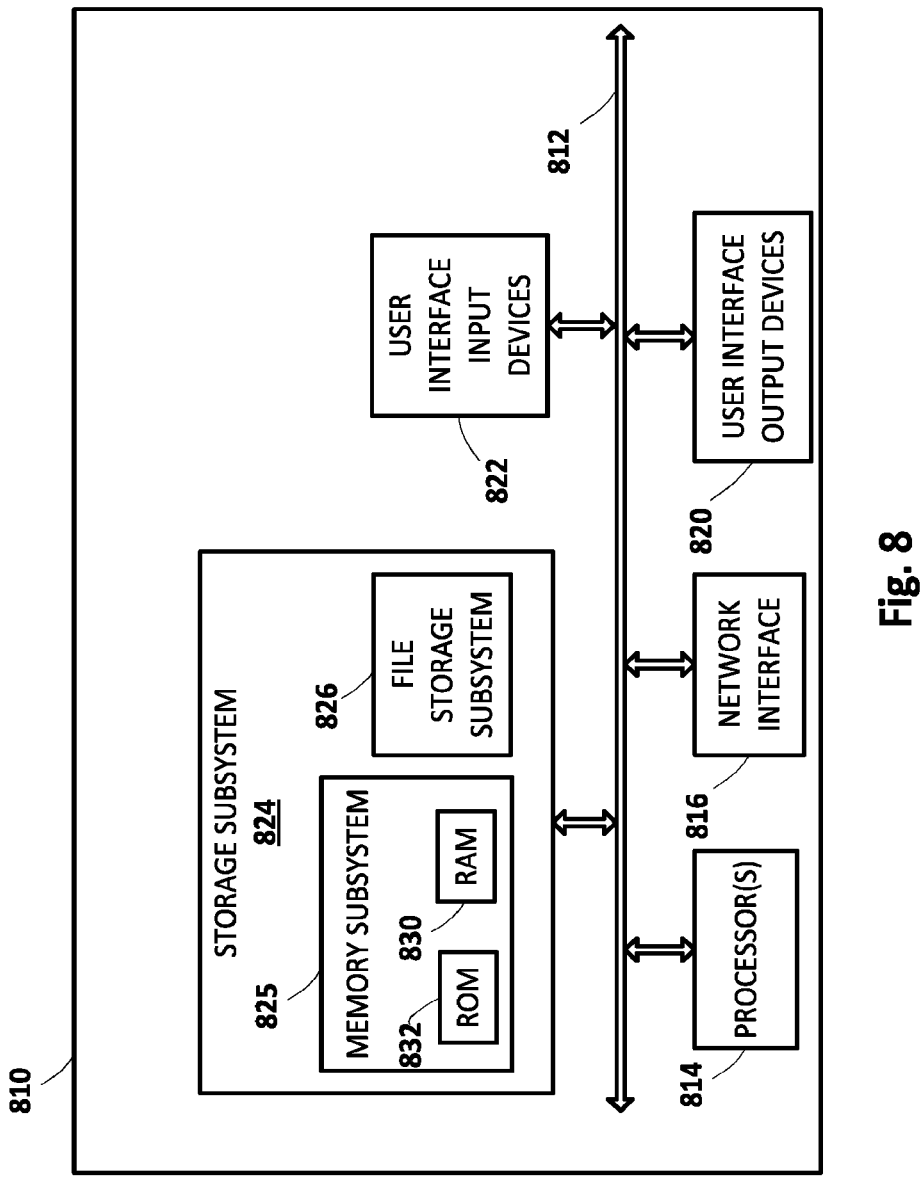
FIG. 8 illustrates an example architecture of a computing device.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touch screen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method of FIG. 7, as well as to implement various components depicted in FIGS. 1-3.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
   conditioning a language model based on one or more demonstration tuples,
   wherein one or more of the demonstration tuples includes a first version of a first source code snippet that exists prior to a planned migration and a second version of the first source code snippet that is desired after the planned migration, and
   wherein the language model is trained on one or more corpuses of source code and one or more corpuses of natural language documentation on the subject of computer programming, and
   wherein the conditioning includes processing one or more of the demonstration tuples to generate one or more intermediate embeddings;
   processing a pre-migration version of a source code file based on the conditioned language model, wherein processing the pre-migration version of the source code file includes processing one or more of the intermediate embeddings in conjunction with the pre-migration version of the source code file as inputs for the conditioned language model for one or more subsequent iterations; and
   based on the processing of the pre-migration version of the source code file, generating a post-migration version of the source code file.

2. The method of claim 1, wherein one or more of the demonstration tuples includes a third source code snippet, an example input for the third source code snippet, and a target output of the third source code snippet given the example input.

3. The method of claim 1, wherein:
   in the second version of the first source code snippet, at least a first token is transformed into a target nomenclature;
   in the post-migration version of the source code file, at least a second token that is different from the first token is transformed into the target nomenclature.

4. The method of claim 3, wherein the target nomenclature captures a desired coding style used by an entity.

5. The method of claim 3, wherein the target nomenclature captures a desired coding style espoused by computer programming educational literature that is included in one or more of the corpuses of natural language documentation about computer programming.

6. The method of claim 1, comprising receiving one or more of the demonstration tuples via textual input provided by a user.

7. The method of claim 1, comprising selecting one or more of the demonstration tuples from a library of existing demonstration tuples based on user input.

8. The method of claim 7, wherein the user input comprises a free-form natural language input spoken or typed by a user, and the selecting is based on semantic similarity between the free-form natural language input and the selected one or more of the demonstration tuples.

9. The method of claim 1, wherein one or more of the demonstration tuples includes a natural language snippet that describes the first source code snippet, and wherein the method includes, based on the processing, generating another natural language snippet that describes the source code file.

10. The method of claim 1, further comprising:
performing a semantic comparison of the pre-migration source code file and the post-migration source code file; and
based on the semantic comparison:
selecting another post-migration version of the source code file from a
distribution generated by the language model; or
performing supervised training on the language model based on the pre-migration and post-migration versions of the source code file.

11. A method implemented using one or more processors, comprising:
conditioning a language model based on one or more demonstration tuples,
wherein one or more of the demonstration tuples includes a first version of a first source code snippet that exists prior to a planned migration, an example input for the first source code snippet, and a target output of the first source code snippet given the example input,
wherein the language model is trained exclusively on one or more corpuses of source code and one or more corpuses of natural language documentation on the subject of computer programming, and
wherein the conditioning includes processing one or more of the demonstration tuples to generate one or more intermediate embeddings;
processing a pre-migration version of a source code file based on the conditioned language model, wherein processing the pre-migration version of the source code file includes processing one or more of the intermediate embeddings in conjunction with the pre-migration version of the source code file as inputs for the conditioned language model for one or more subsequent iterations; and
based on the processing of the pre-migration version of the source code file, generating a post-migration version of the source code file.

12. A system comprising one or more processors and memory storing instructions that, in response to execution of the instructions by the one or more processors, cause the one or more processors to:
condition a language model based on one or more demonstration tuples,
wherein one or more of the demonstration tuples includes a first version of a first source code snippet that exists prior to a planned migration and a second version of the first source code snippet that is desired after the planned migration,
wherein the language model is trained on one or more corpuses of source code and one or more corpuses of natural language documentation on the subject of computer programming, and
wherein the instructions to condition include instructions to process one or more of the demonstration tuples to generate one or more intermediate embeddings;
process a pre-migration version of a source code file based on the conditioned language model, wherein the instructions to process the pre-migration version of the source code file include instructions to process the pre-migration version of the source code file in conjunction with one or more of the intermediate embeddings as inputs for the conditioned language model for one or more subsequent iterations; and
based on output generated based on processing the pre-migration version of the source code file using the language model, generate a post-migration version of the source code file.

13. The system of claim 12, wherein one or more of the demonstration tuples includes a third source code snippet, an example input for the third source code snippet, and a target output of the third source code snippet given the example input.

14. The system of claim 12, wherein:
in the second version of the first source code snippet, at least a first token is transformed into a target nomenclature;
in the post-migration version of the source code file, at least a second token that is different from the first token is transformed into the target nomenclature.

15. The system of claim 14, wherein the target nomenclature captures a desired coding style used by an entity.

16. The system of claim 14, wherein the target nomenclature captures a desired coding style espoused by computer programming educational literature that is included in one or more of the corpuses of natural language documentation about computer programming.

17. The system of claim 12, comprising instructions to receive one or more of the demonstration tuples via textual input provided by a user.

18. The system of claim 12, comprising instructions to select one or more of the demonstration tuples from a library of existing demonstration tuples based on user input.

19. The system of claim 18, wherein the user input comprises a free-form natural language input spoken or typed by a user, and the one or more of the demonstration tuples are selected based on semantic similarity between the free-form natural language input and the selected one or more of the demonstration tuples.

* * * * *